United States Patent
Miyamori et al.

(10) Patent No.: US 9,964,705 B2
(45) Date of Patent: May 8, 2018

(54) METHOD OF FUSION-SPLICING OPTICAL FIBERS AND FUSION SPLICER

(71) Applicant: SEI Optifrontier Co., Ltd., Yokohama-shi, Kanagawa (JP)

(72) Inventors: Makoto Miyamori, Kanagawa (JP); Yuta Ryono, Kanagawa (JP); Hideaki Yusa, Kanagawa (JP); Toshihiko Homma, Kanagawa (JP)

(73) Assignee: SEI OPTIFRONTIER CO., LTD., Yokohama-shi, Kanagawa (JP)

( * ) Notice: Subject to any disclaimer, the term of this patent is extended or adjusted under 35 U.S.C. 154(b) by 0 days. days.

(21) Appl. No.: 15/058,325

(22) Filed: Mar. 2, 2016

(65) Prior Publication Data
US 2016/0266314 A1 Sep. 15, 2016

(30) Foreign Application Priority Data
Mar. 10, 2015 (JP) ................................. 2015-047299

(51) Int. Cl.
*G02B 6/255* (2006.01)

(52) U.S. Cl.
CPC ......... *G02B 6/2551* (2013.01); *G02B 6/2553* (2013.01)

(58) Field of Classification Search
CPC .... G02B 6/2551; G02B 6/2555; G02B 6/255; G02B 6/2553
See application file for complete search history.

(56) References Cited

U.S. PATENT DOCUMENTS

| | | | |
|---|---|---|---|
| 4,736,632 A * | 4/1988 | Case | G01N 3/14 385/134 |
| 2006/0280417 A1* | 12/2006 | Sato | G02B 6/2553 385/134 |
| 2013/0230286 A1* | 9/2013 | Fukuda | G02B 6/255 385/96 |
| 2013/0236146 A1* | 9/2013 | Takayanagi | G02B 6/2553 385/96 |
| 2013/0284377 A1* | 10/2013 | Takayanagi | G02B 6/2553 156/433 |
| 2014/0083141 A1* | 3/2014 | Iwashita | G02B 6/2553 65/484 |

(Continued)

FOREIGN PATENT DOCUMENTS

| | | | | |
|---|---|---|---|---|
| EP | 2833175 | * | 2/2015 | G02B 6/255 |
| JP | 2003-167151 A | | 6/2003 | |
| WO | WO 2013/145474 A1 | * | 10/2013 | G02B 6/255 |

*Primary Examiner* — Jodi C Franklin
(74) *Attorney, Agent, or Firm* — Drinker Biddle & Reath LLP

(57) ABSTRACT

A splicer and a method for fusion-splicing optical fibers are provided, in which the disconnection of a fusion spliced portion of optical fibers can be prevented when the windbreak cover is opened upon fusion splicing. A method for fusion-splicing optical fibers includes: holding optical fibers on optical fiber holders which are arranged on a pair of movable stages, respectively and covering the holders with a windbreak cover; and butting the optical fibers each other by bringing the pair of movable stages mutually closer; fusion-splicing the butted optical fibers together; and loosening, before opening the windbreak cover 4, the tension applied to optical fibers between the fiber holding parts and positions at which the windbreak cover contacts with the optical fibers.

12 Claims, 3 Drawing Sheets

(56) References Cited

U.S. PATENT DOCUMENTS

| | | | |
|---|---|---|---|
| 2014/0131326 A1* | 5/2014 | Sato | G02B 6/2553 219/121.58 |
| 2015/0049991 A1* | 2/2015 | Kawanishi | G02B 6/2551 385/96 |
| 2015/0168649 A1* | 6/2015 | Fukuda | G02B 6/2558 219/490 |

* cited by examiner

METHOD OF FUSION-SPLICING OPTICAL FIBERS AND FUSION SPLICER

FIELD OF THE INVENTION

The present invention relates to a method and splicer for splicing optical fibers by fusion.

BACKGROUND ART

Japanese patent laid-open No. 2003-167151 discloses a fusion splicer comprising: a main body; a pair of arc electrodes arranged on the main body; holders attached to stages provided on the main body and used for holding optical fibers; and a windbreak cover, which allows free movement of closing/opening, for covering the arc electrodes and the stages. A feed slot for introducing an optical fiber into a holder is formed at each side of the windbreak cover, and an elastic body is provided so as to close an upper part of the feed slot. On the other hand, an elastic body for closing a lower part of the feed slot is provided at each side of the main body at a part corresponding to the elastic body of the housing in the state where the windbreak cover is closed. And the fusion splicer is structured such that an optical fiber is inserted between the elastic body of the windbreak cover and the elastic body of the housing in the state where the windbreak cover is closed.

SUMMARY OF THE INVENTION

Object of the Invention

An object of the present invention is to provide a fusion-splicing method and a fusion splicer, with which the fusion spliced portion of optical fibers will not suffer from disconnection when the windbreak cover is opened after fusion splicing.

Means for Achieving the Object

A fusion-splicing method of the present invention comprises: holding optical fibers on optical fiber holding parts respectively provided on a pair of movable stages and covering the optical fiber holding parts with a windbreak cover; butting end faces of the optical fibers each other by bringing the pair of movable stages mutually closer; fusion-splicing the butted optical fibers together; and loosening, before opening the windbreak cover, the tension applied to optical fibers between the fiber holding parts and positions at which the windbreak cover contacts with the optical fibers.

A fusion-splicing method of the present invention comprises: holding optical fibers on optical fiber holding parts respectively provided on a pair of movable stages and covering the optical fiber holding parts with a windbreak cover; butting the optical fibers each other by bringing the pair of movable stages mutually closer; fusion-splicing the butted optical fibers together; and moving the pair of movable stages so as to distance them from each other before the windbreak cover is opened.

A fusion-splicing method of the present invention preferably further comprises opening the windbreak cover after the moving the pair of movable stages so as to distance them from each other and performing a proof test of the fusion spliced portion of an optical fiber by moving the pair of movable stages so as to be further distanced from each other.

A fusion splicer of the present invention is capable of fusion-splicing optical fibers according to the optical fiber fusion-splicing method of the present invention.

Effect of the Invention

According to the present invention, it is possible to prevent occurrence of disconnection at a fusion spliced portion when removing a fusion-spliced optical fiber from a fusion splicer.

BRIEF DESCRIPTION OF DRAWINGS

FIG. 2A shows a state in which the movable stages are located at an original starting position; FIG. 2B shows a state in which optical fibers are butted each other; and FIG. 2C shows a state in which a tension is applied to the fusion-spliced optical fiber.

DETAILED DESCRIPTION OF THE INVENTION

Figure 1:
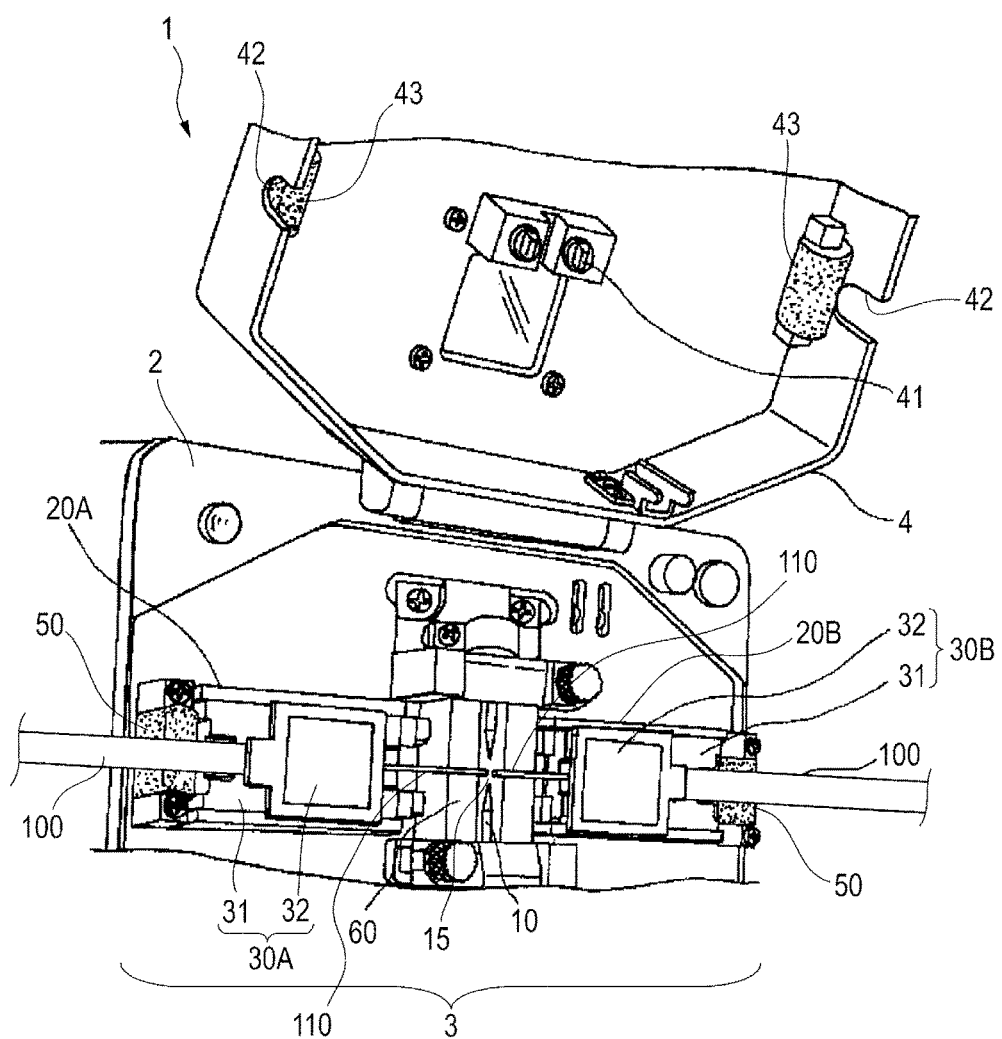
FIG. 1 shows a perspective view of a fusion splicer concerning the present invention, in which its windbreak cover is closed.

Hereafter, an example of embodiment of the optical fiber fusion-splicing method and a fusion splicer concerning the present invention will be described in reference to the drawings. The drawings are provided only for the purpose of explanation, and not intended to limit the scope of the invention. In the drawings, in order to avoid duplication of explanation, the same mark indicates an identical part. The ratio of dimensions in a drawing is not necessarily exact.

In the fusion splicer described in Japanese patent laid-open No. 2003-167151, an optical fiber is held between upper and lower elastic bodies while a windbreak cover is closed, and therefore a load which tends to obstruct the optical fiber from moving along its axial direction is inevitably applied to the optical fiber. For example, such load tends to be applied particularly in a case of cables having a non-circular cross-section or a large diameter (e.g., 20 mm or larger in outside diameter) or a frictional outside surface, such as a drop cable for connection between a subscriber's house and a telegraph pole in a city or an indoor cable used for network in premises or a house. Therefore, if a windbreak cover is opened after fusion-splicing of optical fibers is completed, the load applied to an optical fiber may be released suddenly, causing an optical fiber to move unintentionally in the axial direction, and consequently the fusion spliced portion of optical fibers might be disconnected. An object of the present invention is to provide such fusion-splicing method and fusion splicer as can prevent the fusion spliced portion of optical fibers from being disconnected when a windbreak cover is opened after the fusion-splicing of the optical fibers.

FIG. 1 is a perspective view showing a fusion splicing part 3, where a windbreak cover 4 is opened, in a fusion splicer 1 concerning an embodiment of the present invention. The fusion splicer 1 is an apparatus for fusion-splicing optical fibers at a site where construction of optical fiber facilities is done, for example. The present embodiment is suitable particularly for fusion-splicing optical fibers 110 contained in drop cables 100.

The fusion splicer 1 has a box-like housing 2. The fusion splicing part 3 for carrying out fusion-splicing of optical fibers 110 exposed from drop cables 100 is provided in the upper part of the housing 2. In addition, the fusion splicer 1 has a windbreak cover 4 for preventing a wind from penetrating into the fusion splicing part 3. Moreover, the fusion splicer 1 has a monitor (not shown) for displaying the status of fusion-splicing of the optical fibers 110 as photographed by a camera (not shown) arranged inside the housing 2. An operator can perform the fusion-splicing work, looking at images of the fusion splicing part of the optical fibers 110 as shown on the monitor.

The fusion splicing part 3 includes a pair of arc electrodes 10 and a pair of movable stages 20A and 20B for holding drop cables 100 so as to butt the connecting end-faces of the optical fibers 110 each other between the pair of arc electrodes 10. Holders 30A and 30B (an example of fiber holding part) for holding the drop cables 100 are provided on the pair of stages 20A and 20B, respectively. The fusion splicer 1 is structured such that the fusion splicing part 3 containing the pair of arc electrodes 10 and the movable stages 20A and 20B can be covered with the windbreak cover 4 in a discretionary open/close manner.

The arc electrodes 10 each have a needlelike shape with a sharp tip, and they are arranged facing each other. For fusion-splicing of optical fibers 110, the end faces of the optical fibers 110 are connected by fusion due to heat generated by electric discharge between the electric discharge electrodes 10. The position where the pair of arc electrodes 10 faces each other is defined as an arc part 15.

A pair of movable stages 20A and 20B hold a pair of drop cables 100 through the holders 30A and 30B, respectively. In such manner, the end faces of optical fibers 110 are arranged mutually facing in a direction perpendicularly intersecting the direction in which the arc electrodes 10 are arranged opposite to each other. The pair of movable stages 20A and 20B can horizontally move at the time of fusion-splicing of the optical fibers 110 so that the end faces of the optical fibers 110 may be positioned closer to each other. A V-shaped supporting trench part 60 is formed between the electric discharge electrodes 10 and the movable stages 20A and 20B. Thus, the tip parts of the optical fibers 110 protruding from the holders 30A and 30B respectively is arranged in the V-shaped trench formed on the surface of the V-shaped supporting trench part 60.

The holders 30A and 30B each have a base part 31 and a lid part 32, and are fitted on the movable stage 20A and 20B respectively in a manner allowing their arbitrary attachment and detachment. The holders 30A and 30B respectively hold drop cables 100 between the base part 31 and the lid part 32.

The windbreak cover 4 is connected with the housing 2 so as to cover the fusion splicing part 3 in a manner enabling free opening/closing action. A clamp 41 is provided on the back side (the side opposite to the fusion splicing part 3) of the windbreak cover 4 in order to press the drop cables 100 toward the V-shaped supporting trench part 60 when the windbreak cover 4 is closed. A feed slot 42 for introducing a drop cable 100 to the fusion splicing part 3 (i.e., to the respective part of the holders 30A and 30B) is formed in each side of the windbreak cover 4. The shape of the feed slot 42 is an approximately rectangular cut-away form. An elastic body 43 for covering at least an upper part of each feed slot 42 is formed on the back side of the windbreak cover 4. The elastic body 43 is made of a sponge material or rubber material, for example.

On the other hand, the housing 2 has an elastic body 50 formed at a part corresponding to the respective elastic body 43 so that a lower part of each feed slot 42 may be covered in the state where the windbreak cover 4 is closed. The elastic body 50 also is made of a sponge material or a rubber material, for example. In the state where the windbreak cover 4 is closed, the drop cables 100 are held between the elastic bodies 50 of the housing 2 and the elastic bodies 43 of the windbreak cover 4, while the elastic bodies 50 close the feed slots 42 in collaboration with the elastic bodies 43.

When the windbreak cover 4 is closed in the state where drop cables 100 are put on elastic bodies 50 of the housing 2, the drop cables 100 are pressed down by the elastic force of the elastic bodies 43 and 50. In addition, by closing the windbreak cover 4, the bottom surface of an elastic body 43 and the top surface of an elastic body 50 are deformed according to the shape of a drop cable 100, whereby the gap between the feed slot 42 and the drop cable 100 is closed. This will prevent a wind from entering into the fusion splicing part 3 through a feed slot 42.

Figure 2A:
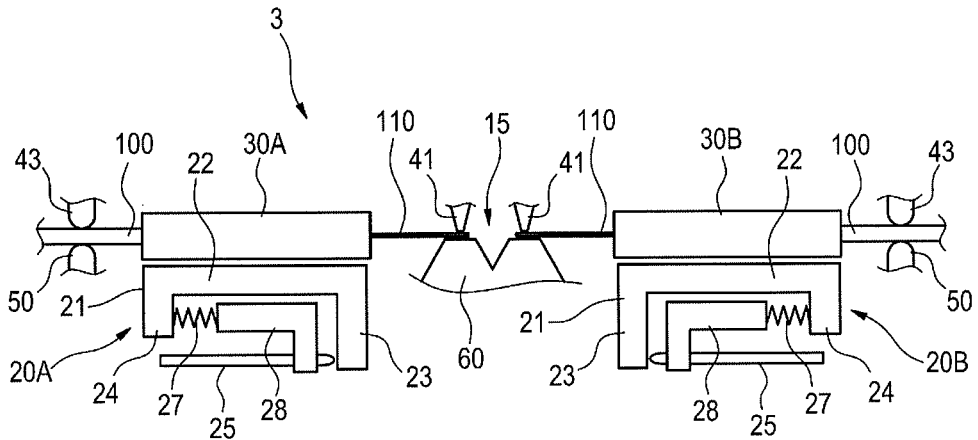
FIGS. 2A, 2B, and 2C are schematic views of movable stages included in a fusion splicer of FIG. 1.
Figure 2B:
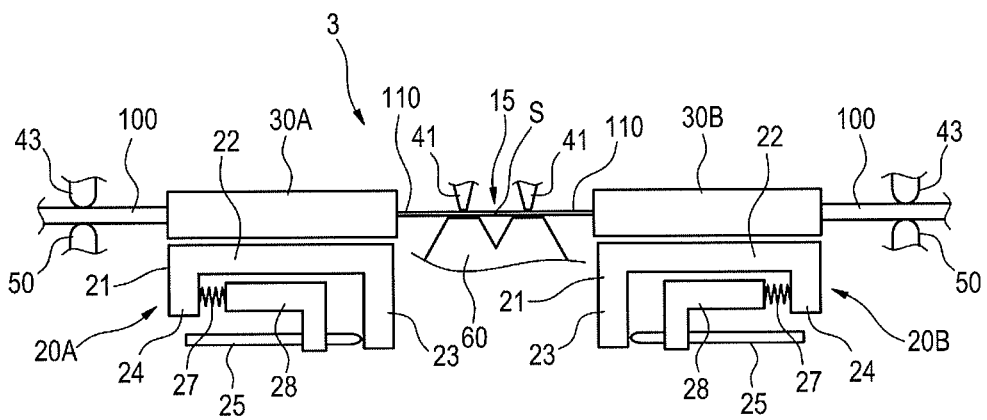
Figure 2C:
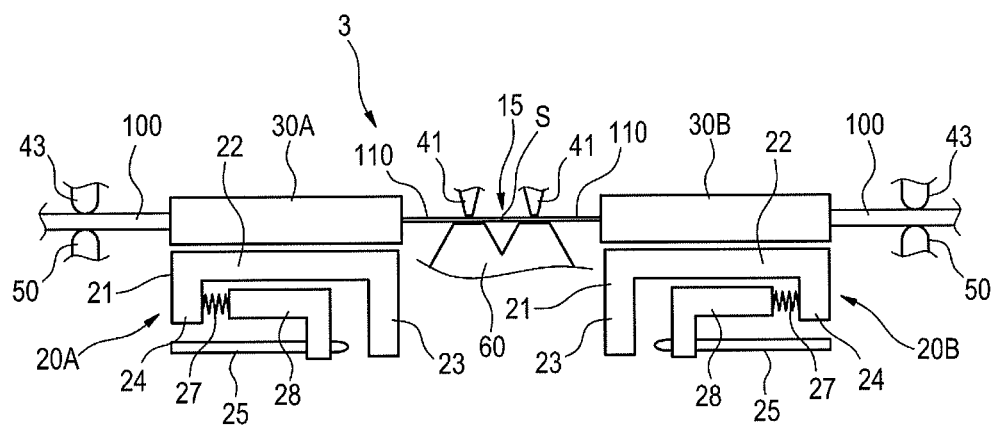

In FIGS. 2A, 2B, and 2C each show schematic diagrams of holders 30A and 30B supported by a pair of movable stages 20A and 20B respectively in the fusion splicer 1. The movable stages 20A and 20B each have a stage main body 21, a feed screw 25, and a spring 27.

The stage main body 21 includes a holder installation part 22, on the upper surface of which the holders 30A and 30B are installed, and a front wall part 23 and a rear wall part 24, which protrude downward from the front and rear sides of the holder installation part 22, respectively. As shown in FIG. 2A, prior to the fusion-splicing of optical fibers 110, each stage main body 21 of the pair of movable stages 20A and 20B is arranged at the original starting position so as to be distanced from each other with an arc part 15 located at the center between them.

A feed screw 25 is provided at a lower position in a stage main body 21, and is movable in the axial direction of drop cables 100 supported by the holders 30A and 30B. The feed screws 25 can move the movable stages 20A and 20B toward the arc part 15 from the original starting position by pushing the stage main body 21 by means of driving force of a motor (not shown). More specifically, as shown in FIG. 2B, by pushing the front wall parts 23 of the stage main bodies 21 from the side opposite to the arc part 15 and thereby advancing the movable stages 20A and 20B closer to each other toward the arc part 15, the feed screws 25 cause end faces of optical fibers 110 to butt each other.

The springs 27 are components for elastically urging the stage main bodies 21 pushed by the feed screws 25 and thereby moving the movable stages 20A and 20B in the direction (the retreat direction) in which they are distanced from the arc part 15. A spring 27 is placed between a spring receiving member 28 and a rear wall part 24 protruding downward at the rear end side of a stage main body 21. The spring receiving member 28 is an approximately L-shaped component, an end of which is connected to the spring 27 and the other end of which is bent downward so that the feed screw 25 is inserted and fixed to a lower part thereof. Specifically, the spring 27 is a compression coil spring.

As shown in FIG. 2B, springs 27 are compressed when feed screws 25 push front wall parts 23 of stage main bodies 21 and movable stages 20A and 20B are moved toward the arc part 15. Conversely, as shown in FIG. 2C, when the feed screws 25 are moved to retreat positions in the direction for departing from the arc part 15, the stage main bodies 21 are elastically urged by the release of compression of the springs 27, and thereby the movable stages 20A and 20B can be let to retreat in the direction for distancing them from the arc part 15.

Figure 3:
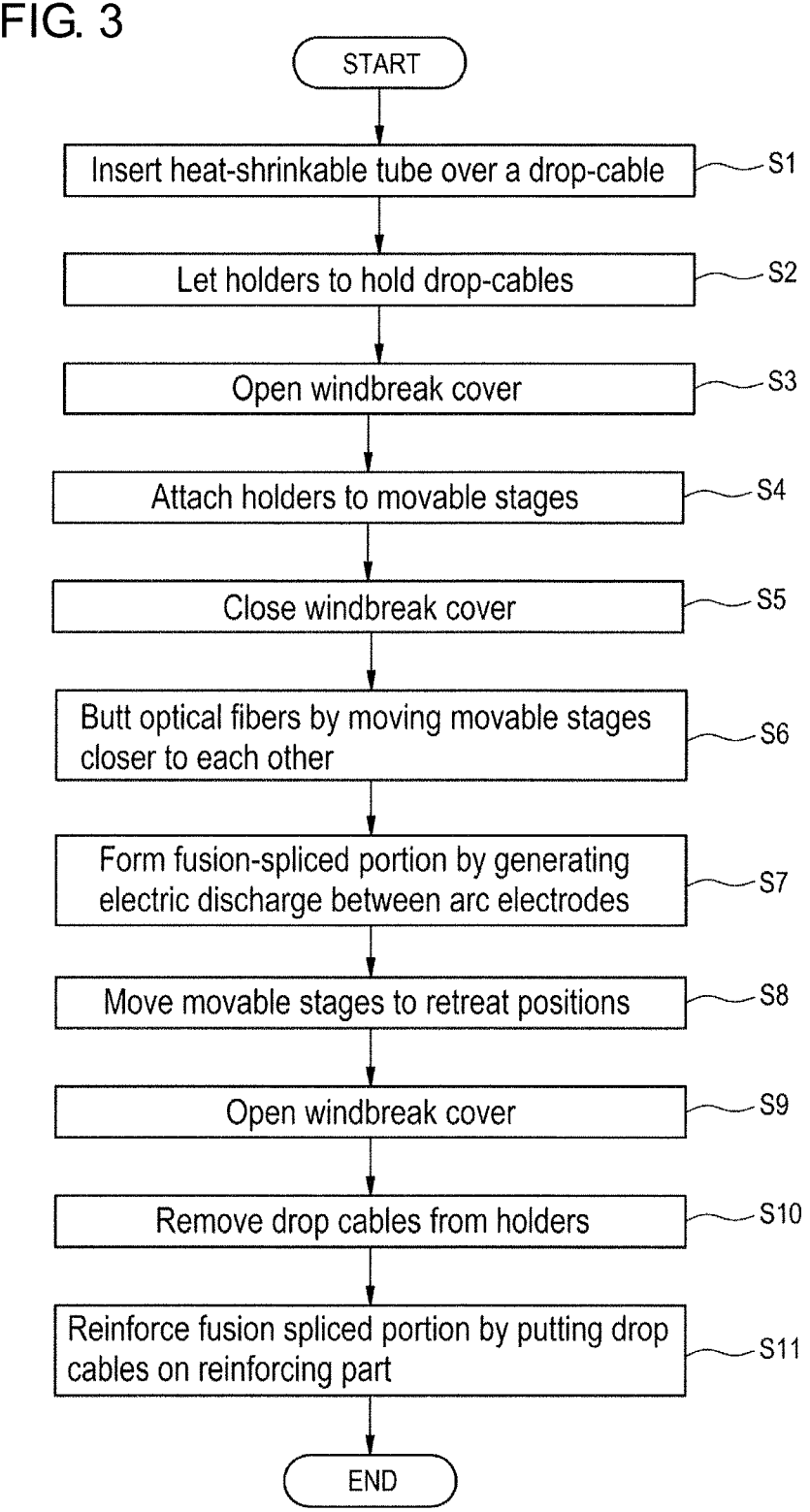
FIG. 3 is a flow chart showing a fusion-splicing method concerning an embodiment of the present invention.

Next, with reference to FIGS. 2A, 2B, and 2C and FIG. 3, a method for fusion-splicing optical fibers 110 of drop cables 100 will be described. FIG. 3 is a flow chart showing the fusion-splicing method concerning an embodiment of the present invention.

First, a heat shrinkable tube (not shown) is inserted over one of drop cables 100 to be mutually connected (S1). The drop cables 100 are each held between a base part 31 and a lid part 32 by opening the respective lid part 32 of holders 30A and 30B (S2). Subsequently, a windbreak cover 4 covering a fusion splicing part 3 is opened (S3). Then, the holders 30A and 30B holding the drop cables 100 are put on a pair of movable stages 20A and 20B of the fusion splicing part 3, respectively (S4). Or instead, the lid parts 32 of the holders 30A and 30B may be opened and the drop cables 100 may be put between the base parts 31 and the lid parts 32 under the conditions where the holders 30A and 30B are put in the fusion splicing part 3. Thus, optical fibers 110 exposed from a pair of drop cables 100 will be positioned to butt each other at the fusion splicing part 3.

In this state, the windbreak cover 4 is closed (S5). When the windbreak cover 4 is closed, the drop cables 100 are held between the elastic bodies 43 and the elastic bodies 50, and the gaps in the feed slots 42 will be covered. In this state, as shown in FIG. 2A, the pair of movable stages 20A and 20B are arranged at the original starting positions with the arc part 15 positioned at the center between them.

Next, core alignment and axial adjustment of optical fibers 110 are conducted by operating the fusion splicing part 3 with the monitor of the fusion splicer 1. More specifically, as shown in FIG. 2B, movable stages 20A and 20B are moved forward mutually closer toward the arc part 15 to a butting position by driving the feed screws 25 so as to push the front wall parts 23 of the stage main bodies 21 from the sides opposite to the arc part 15. Thus, the end faces of the optical fibers 110 are butted each other at this butting position (S6). Then, the end faces of the optical fibers 110 are fusion spliced to form the fusion spliced portion S by generating discharge between a pair of arc electrodes 10 under the conditions where the end faces of the optical fibers 110 are butted each other (S7). At this time, the drop cables 100 held between the holders 30A and 30B and the elastic bodies 43 and 50 will suffer from a tension pulled from both sides.

When the fusion spliced portion S of the optical fibers 110 is formed, the feed screws 25 are let to retreat to their retreat position in the direction for distancing them from the arc part 15 (S8). The compression of the springs 27 is released as the feed screws 25 retreat, and thereby the springs 27 elastically urge the stage main bodies 21 so as to retreat in the retreat direction. This will cause the pair of movable stages 20A and 20B to move in the retreat direction. The amount of movement of the movable stages 20A and 20B until the feed screws 25 retreat to their retreat positions is small (e.g., about 200 µm). In such case, the windbreak cover 4 remains closed as it is. If the pair of movable stages 20A and 20B are retreated in a state where the windbreak cover 4 is closed, the tension applied to the drop cables 100 from the holders 30A and 30B side and the elastic bodies 43 and 50 side can be slightly released.

The windbreak cover 4 is opened after the pair of movable stages 20A and 20B have been moved to a retreated position distanced from each other (S9). Subsequently, the fusion spliced drop cables 100 are removed from the holders 30A and 30B by opening the lid parts 32 of the holders 30A and 30B (S10). Then, with a well-known reinforcing apparatus, a heat shrinkable tube with a reinforcement component (not shown) is put over the fusion spliced portion S of the drop cables 100, and the heat shrinkable tube is shrunk by heat so that the fusion spliced portion S may be reinforced (S11). Finally, the reinforced drop cables 100 are removed from the reinforcing apparatus and stored in a storage place.

In the fusion splicer 1, when the windbreak cover 4 is closed, drop cables 100 are held between the elastic bodies 43 and the elastic bodies 50, so that such a load as restrains their movement in the axial direction is applied to the drop cables 100. Particularly, the drop cables 100 have a large cross-section as compared with other cables, and accordingly the frictional resistance with the elastic bodies 43 and 50 is high. This will tend to prevent the drop cables 100 from moving in their axial direction. Under such conditions, if the pair of movable stages 20A and 20B holding the drop cables 100 are moved to get mutually closer, it will cause a tension to be applied to the drop cables 100 between the holders (30A and 30B) and the elastic bodies (43 and 50).

In a conventional method, the windbreak cover was opened in the state where a tension was applied to drop cables, and there was a case where the drop cables held by the elastic bodies unintentionally moved in their axial direction as a result of sudden release due to such opening of the windbreak cover, whereby the fusion spliced portion of optical fibers was disconnected. Also, there was a case where disconnection occurred when, due to a clearance (about 100 µm) between a holder and a movable stage, fusion-spliced optical fibers were bent between a holder holding a drop cable on one side and another holder holding another drop cable of the other side.

This embodiment includes, prior to opening of the windbreak cover 4, a step of loosening the tension applied to drop cables 100 between the holders (30A and 30B) and the points (i.e., elastic bodies 43 and 50) of the windbreak cover 4 which are in contact with the drop cables 100. More specifically, as shown in FIG. 2C, the tension applied to the drop cables 100 held between the holders (30A and 30B) and the elastic bodies (43 and 50) is slightly loosened by moving a pair of movable stages 20A and 20B a little in a direction for distancing them from the arc part 15. According to this structure, in the case of opening the windbreak cover 4, it is possible to prevent drop cables 100 from unintentionally moving in their axial direction and to reduce the influence of bending (or, buckling) of the optical fibers 110 which may occur between the holders 30A and 30B. Therefore, the occurrence of disconnection at the fusion spliced portion S of the optical fibers 110 can be prevented.

Evaluation

The incidence of bending and disconnection of optical fibers between a pair of holders were evaluated in both cases where after the fusion-splicing and before opening of a windbreak cover, a pair of movable stages were moved in the distancing direction and where they were not moved in the retreat direction. In the comparative example, the windbreak cover was opened without causing the movable stages to retreat from the butting position. As a result, the incidence of bending of optical fibers was 100%, and the disconnection rate of the fusion spliced portion was about 2%. In the case of the embodiment of the invention, the movable stages were both let to retreat by an amount of 200 µm from the butting position, and thereafter the windbreak cover was opened. As a result, the incidence of bending of optical fibers and the rate of disconnection of the fusion spliced portion were both zero %.

As described above, it has been confirmed that if a tension applied to drop cables held between the holders and the elastic bodies is slightly loosened beforehand by moving a pair of movable stages in the direction for distancing them from the arc part, then disconnection and damage to a fusion spliced portion can be prevented because such action enables avoiding the drop cables from moving unintentionally in their axial direction or the optical fibers held between the pair of holders from bending when the windbreak cover is opened.

Heretofore, the present invention has been described with reference to specific embodiments in detail. However, it would be obvious for a person skilled in the art that various changes and modifications can be made without deviating from the scope of the present invention. The number of components, composition, position, form, etc. which have been described above are not limited to the above-mentioned embodiments, and they can be changed into those which are suitable for carrying out the present invention. For example, after opening the windbreak cover 4, a step for performing a proof test of fusion spliced portion S may be provided by moving a pair of movable stages 20A and 20B so as to be further distanced from each other in the retreat direction. The proof test is such that upon fusion-splicing of optical fibers 110, a poorly spliced portion of the optical fibers 110 is fractured beforehand by making the movable stages 20A and 20B to retreat while the holders 30A and 30B hold the drop cables 100 and thereby applying a tensile strength to the fusion spliced portion S.

In the proof test, the feed screw 45 is returned to the original starting position shown in FIG. 2A from the retreat position shown in FIG. 2C, for example. Thus, the pair of movable stages 20A and 20B retreat further, and a tensile strength of about 200 [gf], for example, is applied to the fusion spliced portion S. The proof test is completed after a tension is applied to the fusion spliced portion S from both sides for a predetermined time. Then, the lid parts 32 of the holders 30A and 30B are opened, the fusion-spliced drop cables 100 are removed from the holders 30A and 30B, and thereafter the fusion spliced portion S will be subjected to a process of reinforcement.

For carrying out such proof test, there is a case where the proof test is conducted under the conditions in which the windbreak cover is opened. Therefore, in this modification, even if it is a case where a proof test is carried out, by making the pair of movable stages 20A and 20B to retreat slightly beforehand before opening the windbreak cover 4, disconnection at the fusion spliced portion S can surely be prevented from occurring prior to the proof test.

What is claimed is:

1. A method of fusion-splicing optical fibers comprising:
    holding optical fibers on optical fiber holding parts respectively provided on a pair of movable stages, wherein each stage of the pair of movable stages comprises a stage main body, a feed screw, and a spring, the stage main body including a front wall part, the feed screw configured to push the front wall part to move the pair of movable stages mutually closer, and the spring biasing each stage of the pair of movable stages away from each other;
    covering the optical fiber holding parts with a windbreak cover having feed slots and elastic bodies, each elastic body configured to cover at least an upper part of a feed slot to close a gap between the feed slot and the optical fiber;
    butting end faces of the optical fibers against each other by pushing the front wall part with the feed screw to bring the pair of movable stages mutually closer, while compressing the spring;
    fusion-splicing the butted optical fibers together;
    before opening the windbreak cover, relieving tension applied to the optical fibers between the fiber holding parts and positions at which the windbreak cover contacts with the optical fibers by moving the feed screw to a feed screw retreat position to retreat the pair of movable stages away from each other to respective retreat positions, while urging the pair of the movable stages by the spring; and
    opening the windbreak cover after the moving the pair of movable stages.

2. The method of fusion-splicing optical fibers according to claim 1, wherein the spring of each stage of the pair of movable stages is biased away from an arc part which performs the fusion-splicing.

3. The method of fusion-splicing optical fibers according to claim 1, wherein the pair of movable stages are brought mutually closer to butt end faces of the optical fibers when the spring of each stage of the pair of movable stages is compressed.

4. The method of fusion-splicing optical fibers according to claim 1, wherein the moving of each feed screw of each stage of the pair of moveable stages to the feed screw retreat position causes the spring of each stage of the pair of movable stages to elastically urge to the retreat position by release of the compression of each spring of each stage of the pair of movable stages, thereby causing the pair of moveable stages to move to the retreat position.

5. The method of fusion-splicing optical fibers according to claim 1, wherein the optical fibers are tensioned between the holding parts and the elastic bodies when the windbreak cover is closed and the end faces of the optical fibers are butted.

6. The method of fusion-splicing optical fibers according to claim 1, the method further comprising performing a proof test of the fusion spliced portion of the optical fibers by moving the pair of movable stages from the respective retreat positions to further distance the movable stage from each other after the opening of the windbreak cover.

7. A method of fusion-splicing optical fibers comprising:
    holding optical fibers on optical fiber holding parts respectively provided on a pair of movable stages, wherein each stage of the pair of movable stages comprises a stage main body, a feed screw, and a spring, the stage main body including a front wall part, the feed screw configured to push the front wall part to move the pair of movable stages mutually closer, and the spring biasing each stage of the pair of movable stages away from each other;
    covering the optical fiber holding parts with a windbreak cover having feed slots and elastic bodies, each elastic body configured to cover at least an upper part of a feed slot to close a gap between the feed slot and the optical fiber;
    butting end faces of the optical fibers against each other by pushing the front wall part with the feed screw to bring the pair of movable stages mutually closer, while compressing the spring;
    fusion-splicing the butted optical fibers together;
    moving the feed screw to a feed screw retreat position to retreat the pair of movable stages to respective retreat positions to distance each stage of the pair of movable stages from each other, while urging the pair of the movable stages by the spring before the windbreak cover is opened; and
    opening the windbreak cover after the moving the pair of movable stages.

8. The method of fusion-splicing optical fibers according to claim 7, wherein the spring of each stage of the pair of movable stages is biased away from an arc part which performs the fusion-splicing.

9. The method of fusion-splicing optical fibers according to claim 7, wherein the pair of movable stages are brought mutually closer to butt end faces of the optical fibers when the spring of each stage of the pair of movable stages is compressed.

10. The method of fusion-splicing optical fibers according to claim 7, wherein the moving of each feed screw of each stage of the pair of moveable stages to the feed screw retreat position causes the spring of each stage of the pair of movable stages to elastically urge to the retreat position by release of the compression of each spring of each stage of the pair of movable stages, thereby causing the pair of moveable stages to move to the retreat position.

11. The method of fusion-splicing optical fibers according to claim 7, wherein the optical fibers are tensioned between the holding parts and the elastic bodies when the windbreak cover is closed and the end faces of the optical fibers are butted.

12. The method of fusion-splicing optical fibers according to claim 7, the method further comprising performing a proof test of the fusion spliced portion of the optical fibers by moving the pair of movable stages from the respective retreat positions so as to further distance the movable stage from each other after the opening of the windbreak cover.

* * * * *